United States Patent [19]

Takahashi et al.

[11] 3,955,807
[45] May 11, 1976

[54] SUSPENSION DEVICE FOR A VEHICLE

[75] Inventors: Noriyuki Takahashi, Tokyo; Hidehiko Inoue, Saitama; Hiromitsu Miyahara, Tokyo, all of Japan

[73] Assignee: Honda Giken Kogyo Kabushiki Kaisha, Tokyo, Japan

[22] Filed: May 29, 1975

[21] Appl. No.: 581,927

[52] U.S. Cl. .............................. 267/65 B; 280/708
[51] Int. Cl.² ......................................... F16F 3/07
[58] Field of Search .................... 280/124 F, 6 H; 267/65 A, 65 B, 65 D, 64 R

[56]  References Cited
UNITED STATES PATENTS

| | | | |
|---|---|---|---|
| 3,788,627 | 1/1974 | Wieland | 267/65 B |
| 3,815,885 | 6/1974 | Moulton | 267/65 B |

*Primary Examiner*—Philip Goodman
*Attorney, Agent, or Firm*—Haseltine, Lake & Waters

[57] ABSTRACT

A suspension device for use in a vehicle, adapted to be arranged between a wheel suspension member and the body structure of the vehicle and capable of increasing the spring rate of the device to a substantial extent in a relatively low load range so as to minimize the pitching and/or rolling motion of the vehicle while retaining its intrinsic pneumatic spring characteristics in the relatively high load range so as to bear a considerably heavy load imposed thereupon, for the purpose of providing improved running stability of the vehicle without impairing the riding comfort thereof. The device includes a telescopic shock absorber filled with hydraulic fluid, a spring unit having a pneumatic spring chamber containing air or gas under pressure and a hydraulic fluid chamber in communication with the interior of said shock absorber, both defined therein by means of an elastic diaphragm on the opposite sides of the latter, and a spring means such as an elastic rubber spring disposed within the hydraulic fluid chamber in facing relation with the diaphragm for resisting the inflation of the pneumatic spring chamber in response to extensive movement of the shock absorber beyond a definite length.

3 Claims, 4 Drawing Figures

SUSPENSION DEVICE FOR A VEHICLE

BACKGROUND AND SUMMARY OF THE INVENTION

This invention relates to a vehicle suspension device and more particularly to such a device of the type which includes a hydraulic shock absorber and a spring unit communicating with the interior of the shock absorber and having a pneumatic spring chamber defined by an elastomeric diaphragm on one side thereof, the spring chamber being filled with compressed air or gas so as to bear a compressive load imposed upon the shock absorber.

The conventional vehicle suspension devices of the type described have the advantage that under high load conditions, the spring rate of the pneumatic spring chamber is increased in proportion to the load increase so that the shock absorber can act to effectively bear the increased load without affecting the comfort in riding of the vehicle, to which the devices are fitted, but have the disadvantage that under low load conditions, the spring rate is greatly reduced to enlarge the amounts of extension and contraction of the shock absorber. In other words, the shock absorber has a tendency to overrespond to load variations to amplify pitching, rolling and/or vibratory motions of the vehicle, thereby reducing the maneuverability thereof to a substantial extent.

Therefore, this invention is intended to provide a vehicle suspension device of the type described which is capable of eliminating the abovementioned deficiency inherent to the conventional devices so as to support the body of a vehicle in its most stable attitude irrespective of the load condition without any appreciable loss of comfort in riding.

The above and other objects, features and advantages of the invention will more fully understood from the following description when taken in conjunction with the accompanying drawings, which illustrate one preferred embodiment of the invention.

BRIEF DESCRIPTION OF THE PREFERRED EMBODIMENT

Figure 1:
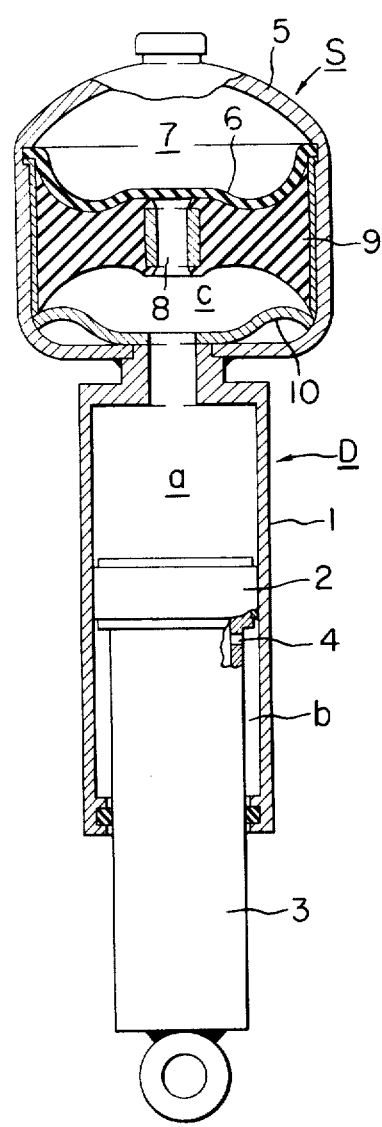
FIG. 1 is a longitudinal section of the suspension device constructed according to the invention.

Referring to the drawings and particularly to FIG. 1, relating to the rest position of the inventive device, there is shown a hydraulic shock absorber of known type, generally indicated by reference character D, which includes a cylinder 1 connected to the body structure of a vehicle (not shown) and filled with damping fluid, a piston 2 slidably received in the cylinder 1 and a hollow piston rod 3 extending from the under face of the piston 2 and connected to the associated wheel suspension member (not shown) of the vehicle. A pair of first and second hydraulic fluid chambers $a$, $b$ are defined in the cylinder 1 by the piston 2 on the opposite sides thereof, the chambers being in fluid communication with each other through an axially extending bore formed in the piston rod 3 and a radial passage 4 formed in the side wall of the piston rod 3 so that the piston 2 cn freely move in the axial direction within the cylinder 1.

Figure 2:
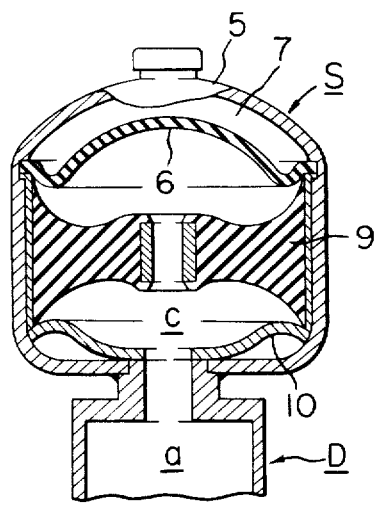
FIGS. 2 and 3 show the essential parts of the device illustrated in FIG. 1 in different operating states.

Arranged on the top of the cylinder 1 is a spring unit, generally designated by reference character S, which will be hereinafter described in detail. The spring unit S has a casing 5 within which is defined by means of an elastomeric diaphragm 6 on the upper side thereof a pneumatic spring chamber 7, which is filled with compressed air or gas such as nitrogen gas, and on the under side thereof a third hydraulic fluid chamber $c$, which is at all times in fluid communication with the first hydraulic chamber $a$ by way of a communication conduit. A disc-shaped spring means 9 made of elastic rubber or like material adheres at its radially outer peripheral surface to the interior surface of the third hydraulic chamber $c$, the spring means being formed with a fluid passage 8 at the central portion thereof and an abutment plate 10 is disposed on the bottom of the third chamber $c$ so as to face the spring means 9. Thus, the rubber spring 9 in its free or undeformed state is spaced at the central portion a definite distance from the abutment plate 10, as shown in FIGS. 1 and 2, but in cases where the shock absorber D is unloaded, the rubber spring 9 is forced downwardly under the action of the compressed air or gas in the pneumatic spring chamber 7 through the elastomeric diaphragm 6 into abutting engagement with the abutment plate 10, as shown in FIG. 3, resisting the inflation of the chamber 7 under its own resiliency.

Figure 3:
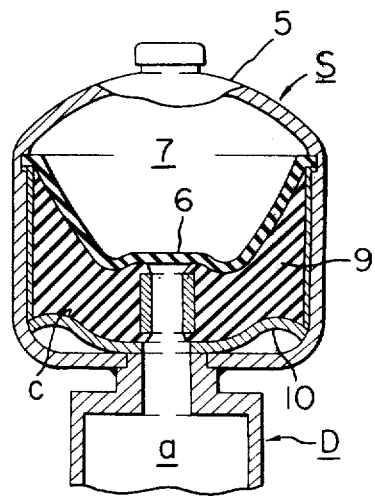

In operation, as the hydraulic shock absorber D is gradually loaded in the compressive sense from its unloaded condition of FIG. 3, the pressure in the respective hydraulic chambers $a$, $b$ of the cylinder 1 is increased and at the same time transmitted therefrom to the third hydraulic chamber $c$, leaving the pneumatic spring chamber 7 and rubber spring 9 in their initial or deformed shapes until the pressure in the third chamber $c$ becomes equalized with that in the pneumatic spring chamber 7. Thus, the shock absorber D remains stationary. When the pressure in the third chamber $c$ is further raised to exceed the initial, prescribed pressure in the pneumatic spring chamber 7, the shock absorber D commences contracting movement and the fluid corresponding in volume to the entering portion of the piston rod 3 into the cylinder 1 is transferred from the first hydraulic chamber $a$ to the third hydraulic chamber $c$, so that the pressure now increased in the chamber $c$ acts to push up the elastic diaphragm 6 together with the rubber spring 9, thereby to compress or deflate the pneumatic spring chamber 7, thus gradually removing the elastic deformation of the rubber spring 9. After the rubber spring 9 is fully restored to its natural or strain-free shape, as shown in FIG. 1, the diaphragm 6 alone is moved upwardly with the further increase in load of the shock absorber D to compress or pressurize the air or gas in the pneumatic spring chamber 7, while leaving the rubber spring 9 in its natural or undeformed state, as clearly shown in FIG. 2. During such upward movement of the elastic diaphragm 6 from the FIG. 1 position to the FIG. 2 position, the pneumatic spring chamber 7 exhibits its intrinsic characteristics of a variable spring rate.

Figure 4:
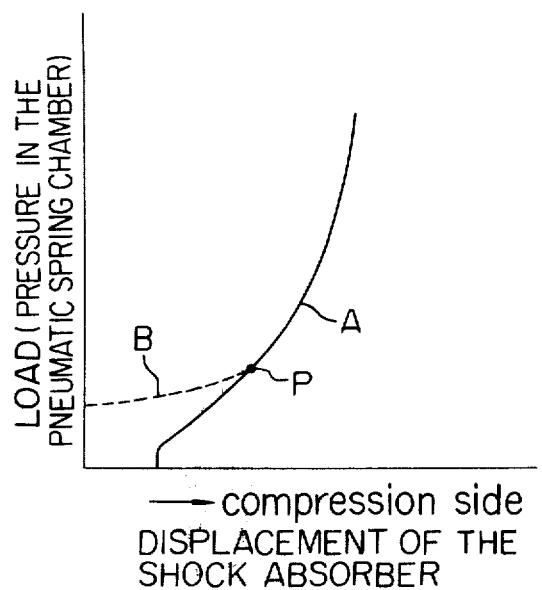
FIG. 4 is a graphic representation of the relationships between the load and the operational displacement of the shock absorber used in the present device and that used in a conventional suspension device of similar type, wherein line A is obtainable with the present device while line B is obtainable with the conventional device.

The above-described behavior of the present device is represented graphically by a full line A in FIG. 4 in terms of the load imposed upon the shock absorber D (or the pressure in the pneumatic spring chamber 7) and the displacement (or length) of the shock absorber D. In this Figure, the point P on the line A indicates the instant at which the diaphragm 6 commences separation from the rubber spring 9 or finishes making full contact therewith a broken line B represents the same relationship as in the case of the line A, but using a conventional suspension device of similar type. In designing the present device, it is desirable to make the initial pressure in the pneumatic spring chamber 7 and the load of the vehicle in its empty state balance with each other at the point P.

As apparent from the foregoing description, according to the present invention, the inflationary movement of the pneumatic spring chamber 7 is effectively resisted in the low load range by the provision of appropriate spring means such as the rubber spring 9, so that the resilient force of the spring means can act to cancel part of the downward biasing force imposed upon the diaphram 6, as resulting from the high pressure in the pneumatic spring chamber 7, thereby correcting the spring rate of the pneumatic spring chamber 7 in the increasing sense to a much greater extent compared with conventional similar devices. Consequently, the operational displacement of the shock absorber D, as caused by load variations, is greatly reduced, particularly under relatively low load conditions, and hence the resistibity to pitching and/or rolling motions of the vehicle is markedly improved, thus resulting in an increased stability in the running attitude of the vehicle. Moreover, in the relatively high load range, the present device can provide the feature of variable spring rate inherent to pneumatic springs and therefore carry considerably heavy loads imposed thereupon in a most smooth and stable manner without impairing the riding comfort of the vehicle.

While one exemplary preferred embodiment of the present invention has been shown and described, it will be apparent to those skilled in the art that it is not so limited but susceptible of various changes and modifications without departing from the spirit or scope of the invention.

What is claimed is:

1. A suspension device for a vehicle including a hydraulic shock absorber, a spring unit defining therein by means of an elastic diaphragm, on opposite sides of the latter, a pneumatic spring chamber adapted to be filled with compressed air or gas and a hydraulic fluid chamber in communication with the interior of said shock absorber, characterized by spring means arranged within said hydraulic fluid chamber for resisting inflation of said pneumatic spring chamber under low load conditions of the device, wherein said spring means is of elastic rubber and has a fluid passage formed therein, said elastic rubber being arranged adjacent said diaphragm and adhering to the interior surface of said hydraulic fluid chamber.

2. The device as claimed in claim 1, further comprising an abutment plate disposed within said hydraulic fluid chamber on the side of said spring means remote from said diaphragm for defining an elastically deformable limit for said spring means.

3. A suspension device for a vehicle, comprising a hydraulic shock absorber, a spring unit having a pressurizable spring chamber and a hydraulic fluid chamber pressurizable by the mechanical operation of said shock absorber, said chambers being formed on opposite sides, of a diaphragm and spring means arranged within said hydraulic fluid chamber so as to resist inflation of said pneumatic spring chamber exceeding a predetermined level, with a resistance force exerted thereon, increasing in proportion to increase in the volume of said pneumatic spring chamber.

* * * * *